United States Patent
Ye et al.

(10) Patent No.: US 12,278,023 B1
(45) Date of Patent: Apr. 15, 2025

(54) INSULATED WIRE AND PREPARATION METHOD THEREFOR, WINDING WIRE, AND ELECTRICAL DEVICE

(71) Applicant: WELL ASCENT ELECTRONIC (GANZHOU) CO., LTD., Ganzhou (CN)

(72) Inventors: Huimin Ye, Ganzhou (CN); Yuejia Zhu, Ganzhou (CN); Zuomao Zhu, Ganzhou (CN); Longping Chen, Ganzhou (CN)

(73) Assignee: WELL ASCENT ELECTRONIC (GANZHOU) CO., LTD., Ganzhou (CN)

( * ) Notice: Subject to any disclaimer, the term of this patent is extended or adjusted under 35 U.S.C. 154(b) by 0 days.

(21) Appl. No.: 19/011,461

(22) Filed: Jan. 6, 2025

(30) Foreign Application Priority Data

Jun. 28, 2024 (CN) .......................... 202410859715.6

(51) Int. Cl.
*H01B 3/36* (2006.01)
*H01B 3/30* (2006.01)
(Continued)

(52) U.S. Cl.
CPC .............. *H01B 3/36* (2013.01); *H01B 3/306* (2013.01); *H01B 13/0016* (2013.01);
(Continued)

(58) Field of Classification Search
CPC ...... H01B 3/36; H01B 3/306; H01B 13/0016; H01B 13/145; H01F 5/06; H02K 3/30
See application file for complete search history.

(56) References Cited

U.S. PATENT DOCUMENTS

2016/0055940 A1* 2/2016 Oya ..................... H01B 13/065
174/110 SR
2017/0178765 A1* 6/2017 Ikeda ..................... H01B 3/427
(Continued)

FOREIGN PATENT DOCUMENTS

| CN | 1499537 A | 5/2004 |
|---|---|---|
| CN | 204440931 U | 7/2015 |

(Continued)

OTHER PUBLICATIONS

Lai et al., "Thermoplastic Polyimide/Poly (ether-ether-ketone) Blended by Mechanical Method", Materials for Mechanical Engineering, vol. 30, No. 7, 2006, 4 pages.
(Continued)

*Primary Examiner* — Timothy J Thompson
*Assistant Examiner* — Rhadames Alonzo Miller
(74) *Attorney, Agent, or Firm* — BCF LLP

(57) ABSTRACT

The present disclosure provides an insulated wire and a preparation method therefor, a winding wire and an electrical device, relating to the technical field of electrochemical elements. The insulated wire includes a conductive wire and an insulating layer coated on the conductive wire, where the insulating layer includes polyetheretherketone and thermoplastic polyimide, and a mass percentage of the polyetheretherketone in the insulating layer is not more than 20%; and the conductive wire is in direct contact with the insulating layer; and after extrusion and cooling for 24 h, under a condition that the insulated wire is ring cut and stretched by 15%, a length of the insulating layer losing adhesion is not greater than 1.9 mm.

20 Claims, 2 Drawing Sheets

(51) Int. Cl.
  *H01B 13/00*  (2006.01)
  *H01B 13/14*  (2006.01)
  *H01F 5/06*  (2006.01)
  *H02K 3/30*  (2006.01)

(52) U.S. Cl.
  CPC ............ *H01B 13/145* (2013.01); *H01F 5/06* (2013.01); *H02K 3/30* (2013.01)

(56) References Cited

U.S. PATENT DOCUMENTS

| | | | | |
|---|---|---|---|---|
| 2017/0178766 | A1* | 6/2017 | Saito | H01B 7/0275 |
| 2017/0236618 | A1* | 8/2017 | Fujimori | H02K 3/30 |
| | | | | 174/110 SR |
| 2018/0375396 | A1* | 12/2018 | Ikeda | H02K 15/105 |

FOREIGN PATENT DOCUMENTS

| | | |
|---|---|---|
| CN | 107004466 A | 8/2017 |
| JP | H03152811 A | 6/1991 |
| WO | 2022179375 A1 | 9/2022 |

OTHER PUBLICATIONS

Office Action with regard to the counterpart CN Patent Application No. 2024108597156 issued Jul. 29, 2024.
Notification to Grant with regard to the counterpart CN Patent Application No. 2024108597156 issued Aug. 30, 2024.

\* cited by examiner

A

INSULATED WIRE AND PREPARATION METHOD THEREFOR, WINDING WIRE, AND ELECTRICAL DEVICE

CROSS-REFERENCE TO RELATED APPLICATIONS

The present disclosure claims the priority of the Chinese patent application No. 202410859715.6, filed with the Chinese Patent Office on Jun. 28, 2024, and entitled "INSULATED WIRE AND PREPARATION METHOD THEREFOR, WINDING WIRE, AND ELECTRICAL DEVICE", which is incorporated herein by reference in its entirety.

TECHNICAL FIELD

The present disclosure relates to the technical field of electrochemical elements, and particularly to an insulated wire and a preparation method therefor, a winding wire and an electrical device.

BACKGROUND ART

Insulated wires are applied in almost every electrical device, for conducting current without causing short circuits that may be caused by contact with a non-electrically insulated conductive wire. Structures thereof generally include a conductive wire made from a metal or an alloy and an insulating layer coated on the conductive wire. In the above, the insulating layer usually uses a thermoplastic resin as a main insulating material thereof.

However, since the conductive wire is usually made from a metal or alloy material, and the insulating layer usually uses the thermoplastic resin, the two have a very poor adhesive force, causing easy detachment between the conductive wire and the insulating layer of the insulated conductive wire. In view of this, an intermediate layer for increasing the adhesive force is usually added between the insulating layer and the conductive wire in the prior art, so as to increase the adhesive force between the insulating layer and the conductive wire. However, a preparation process thereof is complex and takes a long time, which is not conducive to promotion or utilization.

SUMMARY

One of the objectives of the present disclosure is to provide an insulated wire, so as to overcome the defect of poor adhesive force between the insulating layer and the conductive wire in the prior art.

Another objective of the present disclosure is to provide a preparation method for an insulated wire.

A further objective of the present disclosure is to provide a winding wire.

A further objective of the present disclosure is to provide an electrical device.

In the first aspect, the present disclosure discloses an insulated wire, including a conductive wire and an insulating layer coated on the conductive wire, where the insulating layer includes polyetheretherketone and thermoplastic polyimide, and a mass percentage of the polyetheretherketone in the insulating layer is not more than 20%; and the conductive wire is in direct contact with the insulating layer; and after extrusion and cooling for 24 h, under a condition that the insulated wire is ring cut (circumferentially cut) and stretched by 15%, a length of the insulating layer losing adhesion is not greater than 1.9 mm.

Further, in some embodiments of the present disclosure, surface roughness Ra of the conductive wire is greater than 0.5 and less than 1.6.

Further, in some embodiments of the present disclosure, a mass percentage of the polyetheretherketone in the insulating layer is not more than 20% and not less than 5%.

Further, in some embodiments of the present disclosure, the number of bubbles (pores) with a diameter of greater than 30 μm in the insulating layer on a surface of the insulated wire of 100 m is not more than 1, and in the above, the diameter of the bubbles is a maximum width value of a vertical projection on the surface of the conductive wire nearest to the bubbles.

Further, in some embodiments of the present disclosure, a melting point of the thermoplastic polyimide is not lower than 370° C.; and a melting point of the polyetheretherketone is lower than the melting point of the thermoplastic polyimide; and the melting point of the polyetheretherketone is at least 45° C. lower than that of the thermoplastic polyimide.

Further, in some embodiments of the present disclosure, the insulating layer is formed on the surface of the conductive wire through an extrusion process.

In the second aspect, the present disclosure further provides a preparation method for an insulated wire, including a preheating process, a conductive-wire surface treatment process and an extrusion process;

the preheating process includes: preheating a conductive wire to at least 320° C.;

the conductive-wire surface treatment process includes: in a protective gas environment, roughening a surface of the conductive wire to enable surface roughness Ra to be greater than 0.5 and less than 1.6; and the extrusion process includes: forming an insulating layer including the polyetheretherketone and thermoplastic polyimide on the surface of the conductive wire through the extrusion process; and in the above, in the preheating process, the conductive-wire surface treatment process and the extrusion process, temperatures of the conductive wire are all maintained at 320° C. or above.

Further, in some embodiments of the present disclosure, between the preheating process and the conductive-wire surface treatment process, the temperature of the conductive wire is maintained at 320° C. or above; and between the conductive-wire surface treatment process and the extrusion process, the temperature of the conductive wire is maintained at 320° C. or above.

Further, in some embodiments of the present disclosure, differences between the temperatures of the conductive wire in the preheating process, the conductive-wire surface treatment process and the extrusion process and a melting point of the thermoplastic polyimide are not greater than 80° C.

Further, in some embodiments of the present disclosure, an interval between the time when the conductive wire leaves the preheating process and the time when the conductive wire enters the conductive-wire surface treatment process does not exceed 10 s; and an interval between the time when the conductive wire leaves the conductive-wire surface treatment process and the time when the conductive wire enters the extrusion process does not exceed 10 s.

Further, in some embodiments of the present disclosure, a heating method in the preheating process is high-frequency induction heating.

Further, in some embodiments of the present disclosure, the conductive-wire surface treatment process is a plasma surface treatment process.

Further, in some embodiments of the present disclosure, in the conductive-wire surface treatment process, a moving speed of the conductive wire ranges from 8 m/min to 15 m/min;

a gas used in the plasma process is at least one of argon and nitrogen; and/or in the plasma process, an injection angle of a plasma beam ranges from 60° to 90°, where the injection angle of the plasma beam is an included angle between an injection path of the plasma beam and a central axis of the conductive wire; and/or treatment with the plasma beam is performed for 0.1-0.4 s, at a frequency of 45-100 Hz, a pulse voltage of not lower than 220 V, and a current of 1-15 A.

Further, in some embodiments of the present disclosure, a first temperature zone, a second temperature zone, a third temperature zone and a fourth temperature zone are provided in sequence in the extrusion process;

a temperature in the first temperature zone is lower than a melting point of the polyetheretherketone;

a temperature in the second temperature zone is not lower than the melting point of the polyetheretherketone, and lower than a melting point of the thermoplastic polyimide; and temperatures in the third temperature zone and the fourth temperature zone are not lower than the melting point of the thermoplastic polyimide.

Further, in some embodiments of the present disclosure, the temperature in the first temperature zone ranges from 220° C. to 260° C., the temperature in the second temperature zone ranges from 320° C. to 380° C., the temperature in the third temperature zone ranges from 370° C. to 400° C., and the temperature in the fourth temperature zone ranges from 370° C. to 430° C.; and/or the polyetheretherketone and the thermoplastic polyimide stay in the second temperature zone for 10-45 min.

Further, in some embodiments of the present disclosure, a difference between the temperature of the conductive wire in the preheating process and the temperature in the fourth temperature zone in the extrusion process is not greater than 80° C.

In the third aspect, the present disclosure further provides a winding wire, including the insulated wire according to the first aspect or the insulated wire prepared by the preparation method for an insulated wire according to the second aspect.

In the fourth aspect, the present disclosure further provides an electrical device, including the insulated wire according to the first aspect, the insulated wire prepared by the preparation method for an insulated wire according to the second aspect or the winding wire according to the third aspect.

The present disclosure has following beneficial effects.

The present disclosure provides an insulated wire, where the insulating layer with the TPI as a main resin is directly formed through extrusion on a surface of naked conductive wire, and a small amount of PEEK is added therein, so as to restrict small molecular gases generated by decomposition/cracking/chemical reaction of the TPI in the extrusion process from forming large-diameter bubbles in the insulating layer, improve the breakdown voltage and heat resistance of the insulated conductive wire. Meanwhile, the insulated wire provided in the present disclosure still can enable the adhesive force between the insulating layer and the conductive wire to meet requirements without an intermediate layer, has a low cost, and is easy to promote and use.

The insulated wire provided in the present disclosure can be used at a temperature up to 260° C., the local breakdown voltage of the insulating layer of 120 μm or below can be up to 12 KV. The present disclosure further provides a preparation method for an insulated wire, in which preparation method, the conductive wire preheated to the temperature close to the extrusion temperature is subjected to the surface treatment, and then undergoes the extrusion process to form the insulating layer, so that the adhesive force between the formed insulating layer and the conductive wire is excellent, without additionally providing a bonding layer, thus saving a process required by the bonding layer, and meanwhile reducing a thickness of the insulated conductive wire.

The insulated wire provided in the present disclosure can be applied to 800 V high-voltage platform, and electrical devices, such as drive motor, motors, and transformers, of which an operating temperature can be up to 220° C.

DETAILED DESCRIPTION OF EMBODIMENTS

Figure 1:
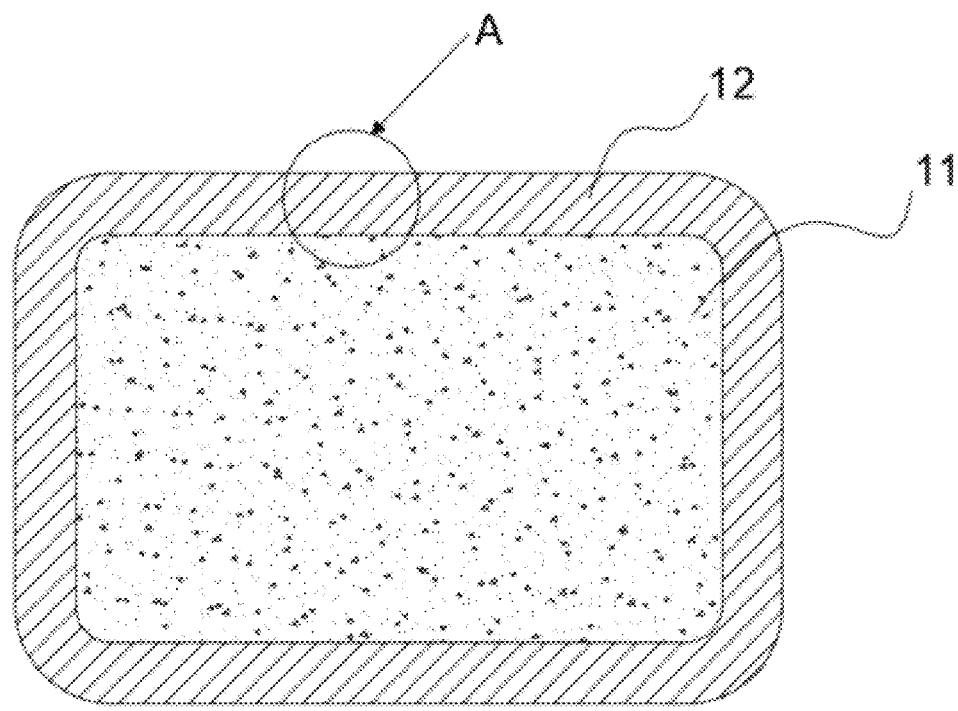
FIG. 1 is a schematic cross section of an insulated wire provided in the present disclosure.

In order to better explain the present disclosure, detailed description is given with reference to embodiments of the present disclosure, and main contents of the present disclosure are further illustrated in conjunction with specific embodiments, but the contents of the present disclosure are not merely limited to the following embodiments.

In the prior art, an insulating layer on an insulated wire is usually obtained by extrusion-molding a thermoplastic resin material on a surface of a conductive wire in one step. However, existing thermoplastic resins usually have a weak adhesive force with the conductive wire, so that the insulated wire is easy to detach in a winding process, thereby affecting an insulation property, heat resistance and voltage resistance thereof. Particularly, an insulating layer formed by extrusion in one step has a lower adhesive force. In view of this, a bonding layer is usually formed through multiple times of coating and curing between the insulating layer and the conductive wire in the prior art, so that the adhesive force between the bonding layer formed through multiple times of coating and curing and the conductive wire is increased, the adhesive force between the insulating layer and the bonding layer is strong, and the adhesive force between the conductive wire and the insulating layer is increased, thus meeting requirement of increasing the adhesive force between the insulating layer and the conductive wire of the insulated wire. However, the process is complex and costly; moreover, as the bonding layer is formed through multiple times of coating and curing, an inner coating layer thereof is heated multiple times and thus is easy to age and affects service lifetime of the insulated wire. Meanwhile, some prior art also proposes roughening a surface of the conductive wire to optimize the adhesive force between the conductive wire and the insulating layer to a certain extent, while such optimization method has a limited improvement effect on the adhesive force between the insulating layer and the conductive wire, and excessive roughness of the surface of the conductive wire tends to cause protrusions on the surface of the conductive wire to be more vulnerable to breakdown during use of the insulated wire, and affects an application range and safety thereof.

In order to solve this technical problem, the applicant found in researches that in a process of roughening the conductive wire, by keeping a higher temperature of the conductive wire, and making the conductive wire enter the extrusion process to form the insulating layer by extrusion while maintaining the temperature, the adhesive force between the formed insulating layer and the conductive wire can reach qualification requirement without an intermediate bonding layer, and is even superior to the qualification requirement. In addition, the insulating layer mainly made from TPI tends to have a large number of bubbles at an extrusion temperature, to affect breakdown resistance and heat resistance of the insulating layer, which can also be addressed by adding a small amount of PEEK.

The present disclosure provides an insulated wire, including a conductive wire 11 and an insulating layer 12 coated on the conductive wire 11, where the insulating layer includes polyetheretherketone and thermoplastic polyimide, a mass percentage of the polyetheretherketone in the insulating layer is not more than 20%, and preferably, the mass percentage of the PEEK in the insulating layer is not more than 15%.

The conductive wire is in direct contact with the insulating layer. After extrusion and cooling for 24 h, under a condition that the insulated wire is ring cut and stretched by 15%, a length of the insulating layer losing adhesion is not greater than 1.9 mm. Preferably, under a condition that the insulated wire is ring cut and stretched by 15%, the length of the insulating layer losing adhesion is not greater than a thickness of the conductive wire.

In the present disclosure, the insulating layer is directly attached to a surface of the conductive wire, and under the condition that the insulated wire is ring cut and stretched by 15%, the qualification requirement that the length of the insulating layer losing adhesion is not greater than 3 mm can be met, without providing an intermediate bonding layer, and arrangement can be better.

It should be noted that the conductive wire in the present disclosure can be made from a metal, such as iron, copper, aluminum, zinc, silver, and nickel, and an alloy, such as iron nickel, iron cobalt nickel, copper nickel, copper cobalt, and iron silicon aluminum.

In some embodiments, surface roughness Ra of the conductive wire is greater than 0.5 and less than 1.6, and preferably, the surface roughness Ra of the conductive wire is greater than 0.8 and less than 1.6, so as to improve adhesion of the insulating layer on the surface of the conductive wire.

In the present disclosure, thermoplastic polyimide (TPI) is taken as a main resin material of the insulating layer, and polyetheretherketone (PEEK) is taken as a secondary resin material of the insulating layer.

Preferably, a mass percentage of the polyetheretherketone in the insulating layer is not more than 20% and not less than 5%. Still further preferably, the mass percentage of the PEEK in the insulating layer ranges from 5% to 15%.

The applicant found that although the thermoplastic polyimide has better heat resistance and voltage resistance, it is easy to form some bubbles in the insulating layer in an extrusion process, which not only reduces mechanical property of the insulating layer, but also causes obvious reduction in local breakdown voltage of the insulating layer in severer cases (places with bubbles are more vulnerable to breakdown). It may be caused by escape of small molecular gases appearing due to decomposition or cracking of the thermoplastic polyimide during the extrusion. This may be one of the key reasons why it is actually difficult for the thermoplastic polyimide in the prior art to be applied to insulated wires alone, especially it is difficult to apply thermoplastic polyimide insulating layers formed by the extrusion process to insulated wires in high-heat-resistance and high-voltage application environments.

In view of this, the applicant added a small amount of the PEEK into the insulating layer, coated the PEEK on surfaces of thermoplastic polyimide particles before extrusion, and then smelted, so as to prevent contact between the TPI and oxygen, and inhibit decomposition or cracking of the thermoplastic polyimide to generate small molecular gases, or inhibit small molecular gases generated by the decomposition or cracking of the thermoplastic polyimide from converging and forming into large-size (e.g. 30 µm or above) bubbles, thus improving mechanical property and local breakdown voltage of the insulating layer formed mainly from the thermoplastic polyimide by extrusion.

It should be noted that, a content of the PEEK in the insulating layer should not be too high or too low. An excessively high content of the PEEK will cause obvious decrease in the heat resistance and voltage resistance of the insulating layer, and an excessively low PEEK content will result in an insufficient inhibition effect thereof on generation of the small molecular gases during the extrusion of the TPI, and cannot obviously overcome the defect of bubbles appearing in the TPI insulating layer.

In some embodiments, the number of bubbles 121 with a diameter of greater than 30 µm in insulating layer 12 of the insulated wire of 100 m is not more than 1. Preferably, the number of bubbles with the diameter of greater than 30 µm in the insulating layer of 1000 m is not more than 1. Still further preferably, in a case where a cross section of the insulated wire is magnified 100 times, it is found that the number of (visual) bubbles is not more than 1, and even (visual) bubbles cannot be found.

Figure 2:
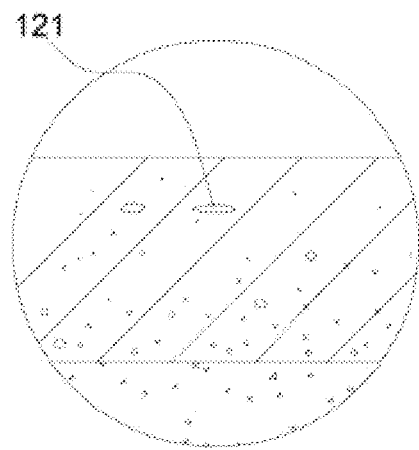
FIG. 2 is an enlarged view of a part A of FIG. 1.

It should be noted that the diameter of the bubbles in the insulating layer of the insulated conductive wire provided in the present disclosure is a maximum width value of a vertical projection of the bubbles on a surface of a conductor nearest to the bubbles. In addition, the applicant found that the bubbles in the insulating layer of the insulated conductive wire provided in the present disclosure, particularly bubbles with a larger diameter, such as bubbles with the diameter of greater than or close to 30 µm, generally are not spherical, as shown in FIG. 1 and FIG. 2. This may be because the bubbles are formed in a short period of time, and this process is accompanied by pressure of a die orifice on the insulating layer and cooling and curing of resins, and forces of the bubbles in all directions are not the same, making it difficult to form large spherical bubbles. This may also be a reason why the insulating layer still can maintain good breakdown resistance and heat resistance even in the presence of large bubbles of approximately 30 µm.

In some embodiments, a melting point of the thermoplastic polyimide is not lower than 370° C., preferably not lower than 380° C., still more preferably not lower than 385° C. A glass transition temperature of the TPI is not lower than 220° C., preferably not lower than 230° C.

In some embodiments, the glass transition temperature of the PEEK may not be higher than 150° C. A melting point of the PEEK is lower than that of the TPI, for example, the melting point thereof can range from 320° C. to 350° C., preferably not higher than 343° C.

The glass transition temperature of the polyetheretherketone is lower than that of the thermoplastic polyimide, and the melting point of the polyetheretherketone is at least 45° C. lower than that of the thermoplastic polyimide, so that in a process of mixing and melting the PEEK and the TPI, the PEEK is molten first and attached to surfaces of TPI particles to form a coating structure, thus inhibiting escape of small molecular gases of the TPI during extrusion, and preventing them from forming a large number of bubbles. Even if some small molecular gases escape, the small molecular gases can also be prevented from converging into larger bubbles in the extrusion process to obviously affect the mechanical property and voltage resistance thereof.

In some embodiments, the insulating layer is formed through an extrusion process on a surface of the conductive wire that has undergone preheating and surface treatment.

In the second aspect, the present disclosure further provides a preparation method for an insulated wire, including a preheating process, a conductive-wire surface treatment process and an extrusion process.

The preheating process includes preheating a conductive wire to at least 320° C.

The conductive-wire surface treatment process includes: in a protective gas environment, roughening a surface of the conductive wire to enable surface roughness Ra to be greater than 0.5 and less than 1.6.

The extrusion process includes: forming an insulating layer including polyetheretherketone and thermoplastic polyimide on the surface of the conductive wire through the extrusion process.

In the above, the conductive-wire surface treatment process is a plasma surface treatment process. It should be noted that, before the conductive wire enters the preheating process, degreasing, cleaning, and drying treatments need to be performed on the conductive wire. A preheating temperature of the conductive wire is not lower than 320° C.

In the above, when preheating the conductive wire, the preheating temperature used is related to an extrusion temperature of resins, that is, the preheating temperature of the conductive wire is preferably close to the extrusion temperature of the resins, for example, when the extrusion temperature of the TPI and PEEK is 410° C., the preheating temperature of the conductive wire can be selected within a range from 360° C. to 410° C. More preferably, the preheating temperature of the conductive wire is equal to or close to the extrusion temperature of the resins. Moreover, the applicant found that in a process from preheating the conductive wire to extruding the resins, the temperature of the conductive wire is preferably kept close to the extrusion temperature of the resins, and an adhesive force between the obtained conductive wire and the insulating layer is better.

In some embodiments, in the preheating process, the conductive-wire surface treatment process and the extrusion process, temperatures of the conductive wire are all maintained at 320° C. or above.

Preferably, differences between the temperatures of the conductive wire in the preheating process, the conductive-wire surface treatment process and the extrusion process and the melting point of the thermoplastic polyimide are not greater than 80° C.

In the above, the preheating process, the conductive-wire surface treatment process and the extrusion process are preferably performed in the protective gas environment, and especially the conductive-wire surface treatment process and the extrusion process both need to be performed in the protective gas environment, so as to avoid oxidation of the surface of the conductive wire by oxygen or other active gases. The protective gas herein can be an inert gas such as nitrogen, helium, and argon.

During the processing, after leaving the preheating process, the conductive wire preferably enters the conductive-wire surface treatment process as soon as possible to undergo the conductive-wire surface treatment; and after the surface treatment, the conductive wire preferably enters the extrusion process as soon as possible, so as to form an insulating layer by extrusion on the surface thereof. Preferably, an interval between the time when the conductive wire leaves the preheating process and the time when the conductive wire enters the conductive-wire surface treatment process does not exceed 10 s; and an interval between the time when the conductive wire leaves the conductive-wire surface treatment process and the time when the conductive wire enters the extrusion process does not exceed 10 s.

In the above, a heating method in the preheating process is preferably high-frequency induction heating, which can realize rapid heating from the inside of the conductive wire to the surface. In the above, the high-frequency induction heating can be performed by a commercially available high-frequency induction heating device, and a heating frequency, voltage and current thereof can be adjusted as required. For example, a cycle frequency can be adjusted within a range of 1-20 KHZ, a voltage thereof can be 380 V, and a current thereof can be 65 A or above.

Preferably, in the conductor surface treatment process, a moving speed of the conductive wire ranges from 8 m/min to 15 m/min; and still further, the moving speed of the conductive wire ranges from 9 m/min to 12 m/min.

A gas used in the plasma process is at least one of argon and nitrogen.

An injection angle of the plasma beam ranges from 60° to 90°, where the injection angle of the plasma beam is an included angle between an injection path of the plasma and a central axis of the conductive wire; and/or treatment with the plasma beam is performed for 0.1-0.4 s, at a frequency of 45-100 Hz, a pulse voltage of not lower than 220 V, and a current of 1-15 A.

Still further preferably, conductive wire moving speeds of the conductive wire in the preheating process, the conductive-wire surface treatment process and the extrusion process are the same or close, so as to control the temperature of the conductive wire, reduce process adjustment, reduce cost, and improve efficiency.

In some embodiments, a first temperature zone, a second temperature zone, a third temperature zone and a fourth temperature zone are provided in sequence in the extrusion process.

A temperature in the first temperature zone is lower than the melting point of the polyetheretherketone.

A temperature in the second temperature zone is not lower than the melting point of the polyetheretherketone and lower than the melting point of the thermoplastic polyimide.

Temperatures in the third temperature zone and the fourth temperature zone are not lower than the melting point of the thermoplastic polyimide.

In the extrusion process, the PEEK and the TPI are mixed in the first temperature zone to form a mixture. The mixture enters the second temperature zone. As the temperature in the second temperature zone is higher than the melting point of the PEEK, and lower than the melting point of the TPI, the PEEK is molten, and is uniformly coated on surfaces of TPI particles by stirring, and then enters the third temperature zone. The temperature in the third temperature zone is further raised, and the TPI is molten to form a molten material, coated on the surface of the conductive wire in the fourth temperature zone, to render an insulating layer with a required thickness through an extrusion port, and the insulated wire is obtained upon cooling and molding.

It can thus be seen that it is necessary that a content of the PEEK in the insulating layer is not too high or too low.

In some embodiments, the temperature in the first temperature zone ranges from 220° C. to 260° C., the temperature in the second temperature zone ranges from 320° C. to 380° C., the temperature in the third temperature zone ranges from 370° C. to 400° C., and the temperature in the fourth temperature zone ranges from 370° C. to 430° C.

In some embodiments, the polyetheretherketone and the thermoplastic polyimide stay in the second temperature zone for 10-45 min, so that the PEEK is completely molten and uniformly coated on the surfaces of the TPI particles.

In addition, the polyetheretherketone and the thermoplastic polyimide stay in the first temperature zone for 10-45 min, so that the PEEK and the TPI are uniformly dispersed, which facilitates uniform coating of the PEEK on the surface of the TPI when being in the second temperature zone.

Preferably, a difference between the temperature of the conductive wire in the preheating process and the temperature in the fourth temperature zone in the extrusion process is not greater than 80° C. Further preferably, the difference between the temperature of the conductive wire in the extrusion process and the temperature in the fourth temperature zone is not greater than 50° C. Further, the difference between the temperature of the conductive wire in the extrusion process and the temperature in the fourth temperature zone is not greater than 30° C.

It should be noted that, in the present disclosure, the fourth temperature zone is a temperature zone where the TPI and PEEK are extruded to form the insulating layer, that is, the temperature in the fourth temperature zone is the extrusion temperature of the resins.

In some embodiments, the polyetheretherketone has a particle size ranging from 10 μm to 100 μm; and the thermoplastic polyimide has a particle size ranging from 1 mm to 3 mm. Preferably, a ratio of the particle size of the PEEK to the particle size of the particles of the thermoplastic polyimide is from 1/100 to 1/10, so that the PEEK and the TPI can be coated more uniformly in the processes of mixing and melt-coating, dispersion uniformity of the PEEK and the TPI in the insulating layer is improved, and meanwhile an amount of the PEEK used can be reduced, thus reducing influence of the addition of the low-heat-resistance PEEK on the heat resistance of the insulating layer.

In the present disclosure, a thickness of the insulating layer can range from 50 μm to 120 μm; and the conductive wire can be a conductive wire with a cross section in a width direction in circular, square, trapezoidal, oval, triangular and other special shapes. Preferably, a dimension of the widest side of the conductive wire can be 0.3-25 mm.

In some embodiments, the TPI and the PEEK are dried and then enter extrusion equipment used in the extrusion process, where the TPI is dried at a temperature of 150° C.-220° C. for 2-24 h, so as to control water content in the dried TPI to be lower than 0.03%; and the PEEK is dried at a temperature of 120° C.-200° C. for 2-24 h, so as to control water content in the dried PEEK to be lower than 0.03%, thus reducing influence of water molecules in raw resin materials on the insulating layer.

Preferably, the TPI and the PEEK are dried in a vacuum environment or a negative-pressure environment.

Still further, the TPI and the PEEK, after being dried, are input into the extrusion equipment through a conveying channel hermetically connected to drying equipment and the extrusion equipment, to mix the TPI and the PEEK. The conveying channel is kept dry and controlled to have oxygen content not higher than 3%.

In some other embodiments, after the extrusion process, the conductive wire for forming the insulating layer is gradually cooled to a room temperature, that is, after the extrusion process, the conductive wire for forming the insulating layer is first cooled to a range of 280° C.-320° C., kept at the temperature temporarily and then cooled, so as to promote crystallization of the TPI, and overcome the defect that the material becomes hard and is easy to crack to cause unstable insulation performance of the insulating layer. Preferably, the temperature is kept for 10-30 s.

In addition, the adhesive force between the insulating layer and the conductive wire of the insulated wire provided in the present disclosure is manifested as gradually increasing after cooling for 24 h and even 48 h; therefore, in applications, it is recommended to perform winding and other applications after cooling for 24 h and even 48 h.

In the third aspect, the present disclosure further provides a winding wire, including the insulated wire according to the first aspect or the insulated wire prepared by the preparation method for the insulated wire according to the second aspect. The winding wire can be a winding wire formed by any winding method, for example, I-pin, Hair-pin, X-pin, and S-winding.

In the fourth aspect, the present disclosure further provides an electrical device, including the insulated wire according to the first aspect, the insulated wire prepared by the preparation method for the insulated wire according to the second aspect or the winding wire according to the third aspect. The insulated wire in the electrical device can go through a winding process, such as in motors, transformers, and inverters, and can also be power transmission lines or conductive wires that are used without winding, such as power transmission wires.

Hereinafter, description is made with several examples related to the present disclosure, but it is not intended to limit the present disclosure to these examples.

Example 1

An example of the present disclosure provided a preparation method for an insulated wire, specifically including the following steps:

S1: taking an oxygen-free copper wire (with a conductor size of 1.5 mm×3.5 mm, oxygen-free copper, R angle 0.3-0.5 mm) having undergone degreasing, cleaning, and drying for later use; vacuum-drying TPI (with a glass transition temperature of 243° C. and a melting point of 388° C.) with an average particle size of 2 mm at a temperature of 150° C. for 4 h for later use; vacuum-drying PEEK (with a glass transition temperature of 143° C. and a melting point of 343° C.) with an average particle size of 50 μm in a drier at a temperature of 180° C. for 4 h for later use;

S2: preheating conductive wire prepared in step S1 to 330° C. with a high-frequency induction heating device in a protective gas ($N_2$) environment, where an interval between the time when the conductive wire leaves step S2 and the time when the conductive wire enters step S3 was 1 s;

S3: treating a surface of the conductive wire preheated in step S2 with argon plasma in a protective gas ($N_2$) environment at a pulse voltage of 300 V and a pulse frequency of 50 Hz, where an injection angle of a plasma beam was 80°; the conductive wire stayed in a plasma treatment device for 0.1 s, so as to render a treated conductive wire; an interval between the time when the conductive wire leaves step S3 and the time when the conductive wire enters step S4 was 1 s; and surface roughness of the formed conductor was Ra 0.8;

S4: maintaining the conductive wire at a temperature of 320° C. or above, making the conductive wire enter extrusion equipment in a protective gas ($N_2$) environment, where temperatures in temperature zones in the extrusion equipment were 220° C., 350° C., 388° C., and 400° C. in sequence; performing extrusion to render a semi-finished product; and adding TPI and PEEK in a ratio of 95:5; and S5: cooling the semi-finished product to 300° C., maintaining the temperature for 12 s, and then cooling and molding, so as to render an insulated wire 1, where an insulating layer had a thickness of 80 μm.

Example 2

An example of the present disclosure provided a preparation method for an insulated wire, specifically including the following steps:

S1: taking a copper wire (with a conductor size of 2 mm×3 mm) having undergone degreasing, cleaning, and drying for later use; vacuum-drying TPI (with a glass transition temperature of 243° C. and a melting point of 388° C.) with an average particle size of 3 mm at a temperature of 200° C. for 12 h for later use; vacuum-drying PEEK (with a glass transition temperature of 143° C. and a melting point of 343° C.) with an average particle size of 100 μm in a drier at a temperature of 150° C. for 8 h for later use;

S2: preheating conductive wire prepared in step S1 to 420° C. with a high-frequency induction heating device in a protective gas ($N_2$) environment, where an interval between the time when the conductive wire leaves step S2 and the time when the conductive wire enters step S3 was 1 s;

S3: treating a surface of the preheated conductive wire with an argon plasma beam in a protective gas ($N_2$) environment at a pulse voltage of 300 V and a pulse frequency of 100 HZ, where an injection angle of the argon plasma beam was 90°; the conductive wire stayed in a plasma treatment device for 0.3 s, so as to render a treated conductive wire; an interval between the time when the conductive wire leaves step S3 and the time when the conductive wire enters step S4 was 1 s; and surface roughness of the formed conductor was Ra 1.0;

S4: maintaining the conductive wire at a temperature of 410° C. or above, making the conductive wire enter extrusion equipment in a protective gas ($N_2$) environment, where temperatures in temperature zones in the extrusion equipment were 250° C., 370° C., 390° C., and 420° C. in sequence; performing extrusion to render a semi-finished product; and adding TPI and PEEK in a ratio of 85:15; and S5: cooling the semi-finished product to 280° C., maintaining the temperature for 12 s, so as to render an insulated wire 2, where an insulating layer had a thickness of 80 μm.

Example 3

Compared with Example 1, in the present example, the preheating temperature of the conductive wire in step S2 was 400° C., the temperature of the conductive wire in step S4 was kept at 390° C. or above, and other steps were the same as those in Example 1, so as to render an insulated wire 3, where the insulating layer had a thickness of 80 μm.

Example 4

Compared with Example 1, in the present example, the preheating temperature of the conductive wire in step S2 was 400° C., the interval between the time when the conductive wire leaves step S2 and the time when the conductive wire enters step S3 was 10 s; the interval between the time when the conductive wire leaves step S3 and the time when the conductive wire enters step S4 was 10 s; the temperature of the conductive wire in step S4 was kept at 330° C. or above, and other steps were the same as those in Example 1, so as to render an insulated wire 4, where the insulating layer had a thickness of 80 μm.

Example 5

Compared with Example 1, in the present example, the preheating temperature of the conductive wire in step S2 was 400° C., the interval between the time when the conductive wire leaves step S2 and the time when the conductive wire enters step S3 was 3 s; the interval between the time when the conductive wire leaves step S3 and the time when the conductive wire enters step S4 was 3 s; the temperature of the conductive wire in step S4 was kept at 370° C. or above, and other steps were the same as those in Example 1, so as to render an insulated wire 5, where the insulating layer had a thickness of 80 μm.

Example 6

Compared with Example 1, in the present example, the preheating temperature of the conductive wire in step S2 was 410° C., the interval between the time when the conductive wire leaves step S2 and the time when the conductive wire enters step S3 was 1 s; the interval between the time when the conductive wire leaves step S3 and the time when the conductive wire enters step S4 was 1 s; the temperature of the conductive wire in step S4 was kept at 400° C. or above, and other steps were the same as those in Example 1, so as to render an insulated wire 6, where the insulating layer had a thickness of 80 μm.

Example 7

Compared with Example 1, step S4 of the present example was: cooling the semi-finished product to 280° C., maintaining the temperature for 12 s, and then cooling and molding, and other steps were the same as those in Example 1, so as to render an insulated wire 7, where an insulating layer had a thickness of 60 μm.

Comparative Example 1

Compared with Example 1, step S2 was omitted in the present comparative example, and other steps were the same as those in Example 1, so as to render a comparative electric wire 1.

Comparative Example 2

Compared with Example 1, step S3 was omitted in the present comparative example, and other steps were the same as those in Example 1, so as to render a comparative electric wire 2.

Comparative Example 3

Compared with Example 1, the preheating temperature of the conductive wire in step S2 of the present comparative example was 200° C., and other steps were the same as those in Example 1, so as to render a comparative electric wire 3.

Comparative Example 4

Compared with Example 1, the preheating temperature of the conductive wire in step S2 of the present comparative example was 300° C., and other steps were the same as those in Example 1, so as to render a comparative electric wire 4.

Comparative Example 5

Compared with Example 1, in the present comparative example, in step S2, the interval between the time when the conductive wire leaves step S2 and the time when the conductive wire enters step S3 was 10 min, the temperature of the conductive wire when entering step S3 was decreased to 100° C. or below, and other steps were the same as those in Example 1, so as to render a comparative electric wire 5.

Comparative Example 6

Compared with Example 1, in the present comparative example, in step S2, the interval between the time when the conductive wire leaves step S3 and the time when the conductive wire enters step S4 was 10 min, the temperature of the conductive wire when entering step S4 was decreased to 100° C. or below, and other steps were the same as those in Example 1, so as to render a comparative electric wire 6.

Comparative Example 7

Compared with Example 1, in the present comparative example, in step S2, the interval between the time when the conductive wire leaves step S3 and the time when the conductive wire enters step S4 was 30 min, the conductive wire was heated again to 320° C. and then entered step S4, and other steps were the same as those in Example 1, so as to render a comparative electric wire 7.

Comparative Example 8

Compared with Example 1, in step S4 of the present comparative example, the mass ratio of the PEEK to the TPI added was 30:70, and other steps were the same as those in Example 1, so as to render a comparative electric wire 8.

Comparative Example 9

Compared with Example 1, in step S4 of the present comparative example, the mass ratio of the PEEK to the TPI added was 50:50, and other steps were the same as those in Example 1, so as to render a comparative electric wire 9.

Comparative Example 10

Compared with Example 1, in step S1 of the present comparative example, the average particle size of the PEEK was 2 mm, the average particle size of the TPI was 2 mm, and other steps were the same as those in Example 1, so as to render a comparative electric wire 10.

Comparative Example 11

Compared with Example 1, in step S4 of the present comparative example, the PEEK was not added, and other steps were the same as those in Example 1, so as to render a comparative electric wire 11.

Physical parameters and property parameters of the conductive wires and the electric wires obtained in the above Example 1 to Example 7 and Comparative Example 1 to Comparative Example 11 were tested respectively by the following test methods, and specific test methods were as follows:

Test Methods:

1-Test of Surface Roughness of Conductive Wires

The roughness of surfaces of conductors was tested with a stylus-type roughness meter.

2-Adhesion Test 300 mm of the insulated wires obtained in Examples 1-7 and Comparative Example 11 were taken as samples respectively. In the middle of length of each sample, the sample was ring cut until the conductor. The sample was placed between two clamps, kept on the same axis as the clamps, with two ends being clamped, and stretched by 15% at a rate of 300 mm/min, to check a length of the insulating layer losing adhesion of the sample.

3-Flexibility Test

The flexibility test was conducted on the insulated wires of Examples 1-7 and Comparative Examples 1-11 respectively by the following method.

Figure 3:
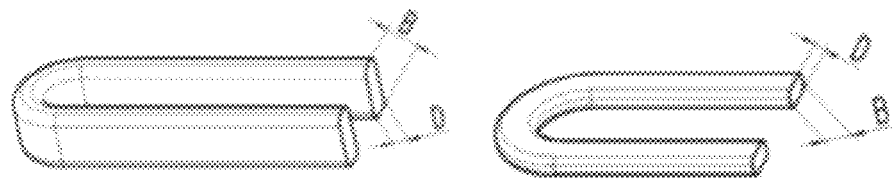
FIG. 3 is a schematic diagram of a test method of a bending machinability test of the present disclosure.

Flexibility test: as shown in following drawing, two 500 mm-long straight insulated wires were respectively bent by 180±2° around a polished test spindle, where one was flat-wise wound (spindle diameter=2 times the wire thickness), and the other was edgewise wound (spindle diameter=2 times the wire width). In FIG. 3, "B" and "D" represent the width and thickness of the insulated wires respectively.

In the present test, after flat-wise winding and edgewise winding, products having smooth surfaces without cracks were recorded as "Pass", while those having cracked surfaces were recorded as "Fail".

4-Test of 5% Brine Breakdown Voltage

Samples should have a length greater than or equal to 4.7 m, and wound according to 20 cm. In the test, a length soaked in the brine was greater than or equal to 4.3 m, a voltage was boosted at a boosting speed of 500 V/s and a leakage current of 5 mA, and breakdown voltages were recorded, and graded in the following manner:

A+: 10 KV or above;

A: 9 KV or above and less than 10 K;

B: 8 KV or above and less than 9 Kb;

C: less than 8 K.

In the above, A and A+ mean Pass, and B and C mean Fail.

5-Bubble Detection

An on-line visual detection device was used to perform on-line bubble detection on the insulated wires. A test method can adopt the visual detection technology in the prior art or the method in the patent application CN202310025492.9.

100 m of the insulated wires of Examples 1-7 and Comparative Examples 1-11 were respectively taken as samples, and on-line visual detection was performed on circumferential insulation coating layers of the samples.

Test results thereof are as shown in TABLE 1.

TABLE 1

| | Surface roughness (Ra) | Length of the insulating layer losing adhesion (mm) | Flexibility test | 5% brine breakdown voltage (KV) | Number of bubbles (pcs/per 100 m) | Dmax (μm) |
|---|---|---|---|---|---|---|
| Example 1 | 0.8 | 1.79 | Pass | A+ | 0 | 27 |
| Example 2 | 1 | 1.65 | Pass | A+ | 0 | 23 |
| Example 3 | 0.8 | 1.66 | Pass | A+ | 1 | 31 |
| Example 4 | 0.8 | 1.88 | Pass | A+ | 0 | 24 |
| Example 5 | 0.8 | 1.73 | Pass | A+ | 1 | 35 |
| Example 6 | 0.8 | 1.63 | Pass | A+ | 1 | 36 |
| Example 7 | 0.8 | 1.78 | Pass | A | 0 | 25 |
| Comparative Example 1 | 0.8 | 6.32 | Fail | C | 0 | 28 |
| Comparative Example 2 | 0.8 | 3.56 | Fail | B | 0 | 29 |
| Comparative Example 3 | 0.8 | 4.23 | Fail | B | 0 | 21 |
| Comparative Example 4 | 0.8 | 2.56 | Pass | A+ | 0 | 27 |
| Comparative Example 5 | 0.8 | 5.62 | Fail | C | 0 | 25 |
| Comparative Example 6 | 0.8 | 5.68 | Fail | C | 0 | 28 |
| Comparative Example 7 | 0.8 | 3.12 | Fail | B | 0 | 23 |
| Comparative Example 8 | 0.8 | 1.92 | Pass | A | 1 | 33 |
| Comparative Example 9 | 0.8 | 2.23 | Pass | B | 1 | 38 |
| Comparative Example 10 | 0.8 | 1.81 | Pass | B | >50 | 88 |
| Comparative Example 11 | 0.8 | 4.47 | Fail | C | >50 | 172 |

Notes: "Number of bubbles (pcs/per 100 m)" in TABLE 1 refers to the number of bubbles with the width of greater than 30 μm on the samples of the 100 m-long insulated wires.

It can be seen from TABLE 1 that, even without adding the bonding layer, the insulating layer made from the TPI as the main resin and having poor adhesion property to the conductive wire can also form good adhesion with the conductive wire, so as to meet the requirement to the adhesive force of the insulated wire. In addition, adding a small amount of the PEEK into the insulating layer can restrict the decomposition/cracking/reaction of the TPI in the extrusion process, reduce the generation of bubbles, especially large-diameter bubbles, and reduce the influence of the bubbles on the adhesive force and breakdown voltage of the insulated wire, so that the obtained insulated wire is suitable for use in high-temperature and high-voltage (high-voltage platforms of 800 V or above) winding wires.

The present disclosure can be implemented in forms other than those described in the above without departing from the spirit thereof. The embodiments disclosed in the present disclosure are examples, but the present disclosure is not limited thereto.

What is claimed is:

1. An insulated wire, comprising a conductive wire and an insulating layer coated on the conductive wire, wherein the insulating layer comprises polyetheretherketone and thermoplastic polyimide, and a mass percentage of the polyetheretherketone in the insulating layer is not more than 20%;
the conductive wire is in direct contact with the insulating layer; and after extrusion and cooling for 24 h, under a condition that the insulated wire is ring cut and stretched by 15%, a length of the insulating layer losing adhesion is not greater than 1.9 mm; and
the number of bubbles with a diameter of greater than 30 μm in the insulating layer on a surface of the insulated wire of 100 m is not more than 1, wherein the diameter of the bubbles is a maximum width value of a vertical projection on the surface of the conductive wire nearest to the bubbles.

2. The insulated wire according to claim 1, wherein surface roughness Ra of the conductive wire is greater than 0.5 and less than 1.6.

3. The insulated wire according to claim 1, wherein the mass percentage of the polyetheretherketone in the insulating layer is not more than 20% and not less than 5%.

4. The insulated wire according to claim 1, wherein a melting point of the thermoplastic polyimide is not lower than 370° C.; and
a melting point of the polyetheretherketone is lower than the melting point of the thermoplastic polyimide; and the melting point of the polyetheretherketone is at least 45° C. lower than that of the thermoplastic polyimide.

5. The insulated wire according to claim 1, wherein the insulating layer is formed on the surface of the conductive wire through an extrusion process.

6. A winding wire, comprising the insulated wire according to claim 1.

7. An electrical device, comprising the winding wire according to claim 6.

8. A preparation method for an insulated wire, comprising a preheating process, a conductive-wire surface treatment process and an extrusion process, wherein
the preheating process comprises: preheating a conductive wire to at least 320° C.;
the conductive-wire surface treatment process comprises:
in a protective gas environment, roughening a surface of the conductive wire to enable surface roughness Ra to be greater than 0.5 and less than 1.6; and the extrusion process comprises: forming an insulating layer comprising polyetheretherketone and thermoplastic polyimide on the surface of the conductive wire through the extrusion process, wherein a mass percentage of the polyetheretherketone in the insulating layer is not more than 20%, and the number of bubbles with a diameter of greater than 30 µm in the insulating layer of 100 m is not more than 1, wherein the diameter of the bubbles is a maximum width value of a vertical projection on the surface of the conductive wire nearest to the bubbles;

wherein in the preheating process, the conductive-wire surface treatment process and the extrusion process, temperatures of the conductive wire are all maintained at 320° C. or above.

9. The preparation method for an insulated wire according to claim 8, wherein between the preheating process and the conductive-wire surface treatment process, the temperature of the conductive wire is maintained at 320° C. or above; and between the conductive-wire surface treatment process and the extrusion process, the temperature of the conductive wire is maintained at 320° C. or above.

10. The preparation method for an insulated wire according to claim 8, wherein differences between the temperatures of the conductive wire in the preheating process, the conductive-wire surface treatment process and the extrusion process and a melting point of the thermoplastic polyimide are not greater than 80° C.

11. The preparation method for an insulated wire according to claim 8, wherein an interval between the time when the conductive wire leaves the preheating process and the time when the conductive wire enters the conductive-wire surface treatment process does not exceed 10 s; and an interval between the time when the conductive wire leaves the conductive-wire surface treatment process and the time when the conductive wire enters the extrusion process does not exceed 10 s.

12. The preparation method for an insulated wire according to claim 8, wherein a heating method in the preheating process is preferably high-frequency induction heating.

13. The preparation method for an insulated wire according to claim 8, wherein the conductive-wire surface treatment process is a plasma surface treatment process.

14. The preparation method for an insulated wire according to claim 13, wherein in the conductive-wire surface treatment process, a moving speed of the conductive wire ranges from 8 m/min to 15 m/min; and a gas used in the plasma surface treatment process is at least one of argon and nitrogen.

15. The preparation method for an insulated wire according to claim 14, wherein in the plasma surface treatment process, an injection angle of the plasma beam ranges from 60° to 90°, wherein the injection angle of the plasma beam is an included angle between an injection path of the plasma beam and a central axis of the conductive wire.

16. The preparation method for an insulated wire according to claim 14, wherein treatment with plasma beam is performed for 0.1-0.4 s, at a frequency of 45-100 Hz, a pulse voltage of not lower than 220 V, and a current of 1-15 A.

17. The preparation method for an insulated wire according to claim 8, wherein a first temperature zone, a second temperature zone, a third temperature zone and a fourth temperature zone are provided in sequence in the extrusion process;

a temperature in the first temperature zone is lower than a melting point of the polyetheretherketone;

a temperature in the second temperature zone is not lower than the melting point of the polyetheretherketone, and lower than a melting point of the thermoplastic polyimide; and temperatures in the third temperature zone and the fourth temperature zone are not lower than the melting point of the thermoplastic polyimide.

18. The preparation method for an insulated wire according to claim 17, wherein the temperature in the first temperature zone ranges from 220° C. to 260° C., the temperature in the second temperature zone ranges from 320° C. to 380° C., the temperature in the third temperature zone ranges from 370° C. to 400° C., and the temperature in the fourth temperature zone ranges from 370° C. to 430° C.

19. The preparation method for an insulated wire according to claim 17, wherein the polyetheretherketone and the thermoplastic polyimide stay in the second temperature zone for 10-45 min.

20. The preparation method for an insulated wire according to claim 17, wherein a difference between the temperature of the conductive wire in the preheating process and the temperature in the fourth temperature zone in the extrusion process is not greater than 80° C.

* * * * *